Aug. 19, 1958 H. A. STORCH 2,848,272
BUMPER FOR LIMITING THE MOVEMENT OF A VEHICLE PANEL
Filed July 29, 1955 2 Sheets-Sheet 1

INVENTOR.
Harold A. Storch
BY
Harness, Dickey & Pierce
ATTORNEYS.

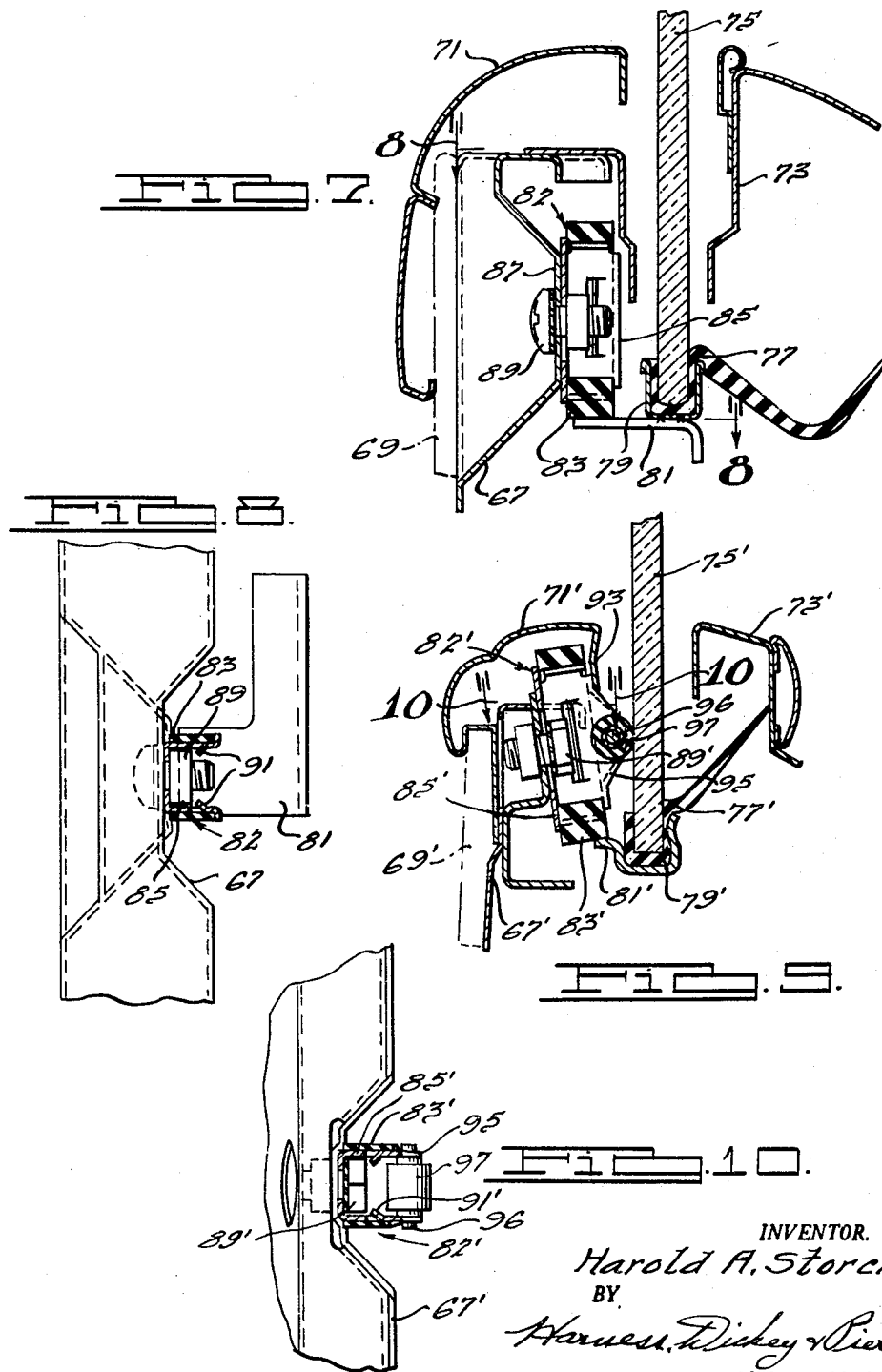

United States Patent Office 2,848,272
Patented Aug. 19, 1958

2,848,272

BUMPER FOR LIMITING THE MOVEMENT OF A VEHICLE PANEL

Harold A. Storch, Birmingham, Mich., assignor to Federal Screw Works, a corporation of Michigan Application July 29, 1955, Serial No. 525,182

12 Claims. (Cl. 296—44)

This invention relates generally to bumper devices, and more particularly to an improved rubber or flexible bumper adapted for use in limiting the movement of a member.

It is an object of this invention to provide an improved bumper device of the type including a sheet metal body having a rubber or flexible member connected therewith and adapted to engage and limit the movement of a movable member.

It is a still further object of this invention to provide a device of the aforementioned type which may be adjustably connected with a member for proper engagement with a relatively movable member so as to limit the movement or position of the latter.

It is a still further object of this invention to provide a bumper device of the aforementioned type which is relatively inexpensive to manufacture, durable in construction and in which the rubber or flexible member is connected with the sheet metal member so that it cannot become accidentally displaced therefrom.

It is a still further object of this invention to provide a bumper device of the aforementioned type which is constructed so that it is capable of replacing several parts now used in various installations.

It is a still further object of this invention to provide a bumper device of the aforementioned type having novel means for preventing movement of the device on a member to which it is connected by a fastener, as well as means for retaining the fastener against accidental displacement from the bumper.

It is a still further object of this invention to provide, in combination with a vehicle door panel, a bumper device of the aforementioned type to limit the movement of the vehicle window glass in an improved and less expensive manner than has been heretofore known.

It is a still further object of this invention to provide a bumper device of the aforementioned type which serves, in a vehicle door installation, also as a support for certain of the door moldings and may also serve as a support for roller means for engaging the window glass and preventing breakage thereof.

These and other objects of this invention will become apparent from the following detailed description taken in conjunction with the accompanying drawings, in which:

Fig. 7 is a cross-sectional view of a portion of an automotive door illustrating a bumper device of this invention limiting the upward movement of a window glass;

Fig. 8 is a sectional view of the structure illustrated in Fig. 7, taken along the line 8—8 thereof;

Fig. 9 is a view, similar to Fig. 7, illustrating a further embodiment of the invention; and Fig. 10 is a sectional view of the structure illustrated in Fig. 9, taken along the line 10—10 thereof.

Figure 1:
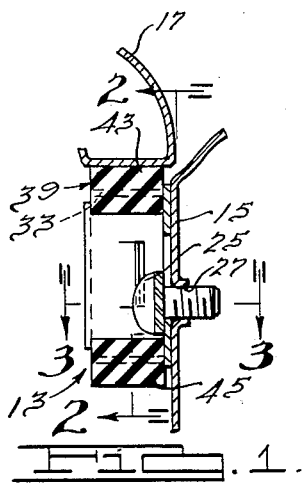
Figure 1 is a longitudinal sectional view of a bumper device of this invention adjustably connected with a stationary member and engaging a movable member so as to limit the movement thereof and position the same.
Figure 2:
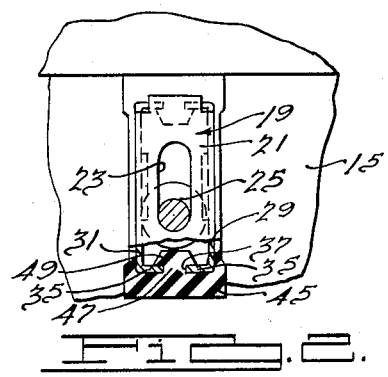
Fig. 2 is a sectional view of the structure illustrated in Fig. 1, taken along the line 2—2 thereof.
Figure 3:
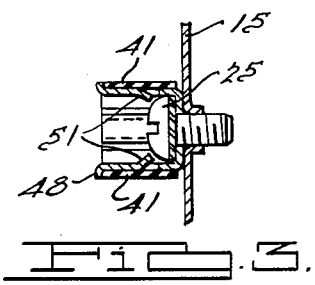
Fig. 3 is a sectional view of the structure illustrated in Fig. 1, taken along the line 3—3 thereof.

Referring now to the drawings, and more particularly to Figs. 1 to 3, it will be seen that the bumper device, indicated generally at 13, is adjustably mounted on a stationary member 15 so as to engage and limit the movement of a movable member 17. The stationary member 15 may be any suitable part, such as, for example, a portion of a body of a vehicle, while the movable member 17 may be, for example, a vehicle hood, door, or rear deck truck lid or door, or other suitable member whose movement in closed position is to be controlled and where metal-to-metal contact is not desired, thus avoiding rattles or other undesirable noises. The bumper device 13 illustrated in Figs. 1 to 3 includes a generally rectangular shaped sheet metal body 19. The sheet metal body is preferably formed by bending a sheet metal blank cut to the desired shape and size, and includes a back wall 21 having an aperture 23 therein through which a fastening element, such as a screw 25, may extend for engagement with a nut or thread-like impression 27 in the member 15. In either case, by inserting the screw through the bumper aperture 23 and positioning the back wall 21 in engagement with the member 15, the bumper device can be adjustably secured to the member 15. In the particular illustration, the aperture 23 is an elongated slot so that the position of the bumper 13 relative to the member 15 can be adjusted in order to engage the movable member 17 at the desired point. It will, of course, be appreciated that instead of elongating the aperture 23 in the bumper, an elongated aperture could be provided in the member 15 to permit the adjustment. In such case, a nut would be applied to the threaded shank of the screw 25, or a rivet or other type fastening element used to secure the bumper in position on the member 15.

The sheet metal body blank is bent to provide side walls 29 and 31 which extend forwardly from the back wall and substantially at right angles thereto. The side walls extend above and below the extremities of the back wall 21, and the extreme ends of the side walls are bent inwardly to provide upper flanges 33 and lower flanges 35. The flanges 33 and 35 have their adjacent inner ends spaced apart to provide a space or slot 37 therebetween. Thus the flanges 33 and 35 provide, in effect, top and bottom walls for the body, which walls have a space or slot extending from front to rear intermediate the ends thereof. A flexible sleeve 39 is sleeved over the top, bottom and side walls of the metal body 21 so as to engage the outer surfaces of these walls. The flexible sleeve may be made of any suitable material, such as rubber or the like, and has side walls 41, a top wall 43 and a bottom wall 45. The top and bottom walls 43 and 45 are provided with ribs 47 which extend downwardly and upwardly, respectively, therefrom. The ribs 47 are disposed in the spaces or slots 37 in the upper and lower walls and each has an enlarged head portion 49 on the inner end thereof disposed within the hollow body. The back edges of the ribs 47 engage the back wall 21 to limit the movement of the flexible sleeve on the metal body and to properly position the flexible sleeve around the body 19. The front edges of the side walls 29 and 31 may have out-turned flanges 48 thereon to engage the front edges of the flexible sleeve side walls. The ribs and head portions 47 and 49 of the flexible sleeve and the flanges 48 prevent accidental disengagement of the flexible sleeve from the sheet metal body. Such an arrangement is desirable for, while the sleeve is stretched over the sheet metal body, the frictional engagement with the periphery of the body may not alone be enough to prevent the flexible sleeve from working its way off of the body under all circumstances.

In the embodiment illustrated in Figs. 1 to 3, it will be noticed that the sheet metal body side walls 29 and 31 have inwardly lanced projections 51 which prevent the fastening element 25 from becoming accidentally disengaged from the bumper during shipping and installation. In the formation of the bumper, the screw is inserted into the sheet metal body opening 23 before the side walls 29 and 31 are bent to their final position, so that after the side walls reach their final position, the fastener will be held against accidental disengagement. It will also be appreciated that various types of fastener elements may be carried by the bumper and not necessarily a screw or bolt.

After the bumper has been formed with the flexible sleeve thereon, it is mounted on the member 15 and suitable adjustment made to bring the top of the flexible sleeve top wall 43 in proper position for engaging the movable member 17 when it is in its desired position, thus cushioning the movement of the member 17 and supporting the same in a desired position and insulating the same from the member 15 without any vibrations, rattles or other undesirable noises. Thus, the bumper can be quickly and easily adjustably positioned without the necessity of using special brackets or other devices or parts.

Figure 4:
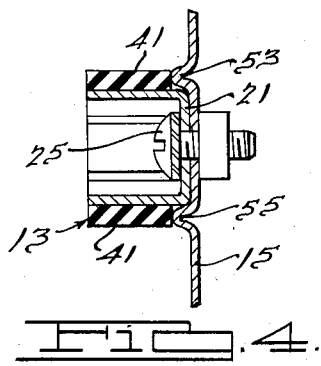
Fig. 4 is a sectional view, similar to Fig. 3, illustrating a further embodiment of the invention.

In certain types of installations, it is desirable to retain the bumper against rotation about the axis of the fastening element, and one means of accomplishing this is to provide, as illustrated in Fig. 4, spaced apart inwardly projecting ribs 53 and 55 on the member 15, the inner ends of the ribs being adapted to engage the back edges of the flexible sleeve side walls 41 with the back wall 21 of the sheet metal body being disposed between the ribs 55. Therefore, the ribs 53 and 55 will prevent rotation of the bumper 13 about the axis of the fastener element 25.

Figure 5:
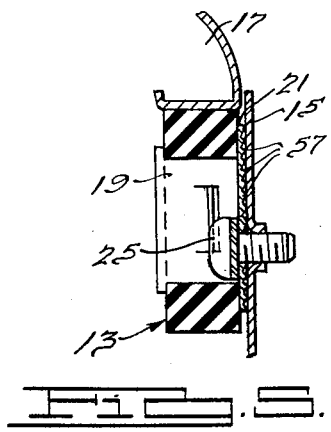
Fig. 5 is a view, similar to Fig. 1, illustrating a further embodiment of the invention.

In the embodiment illustrated in Fig. 5, the bumper device 13 is substantially identical to that previously described and is mounted on the member 15 to limit movement of the movable member 17. In order, however, to more definitely lock the bumper 13 against movement relative to the member 15, the back wall 21 of the sheet metal body 19 is serrated at 57 so as to provide teeth which will, in effect, dig into the surface of the member 15 when the fastener 25 is tightened to more positively lock the bumper against movement.

Figure 6:
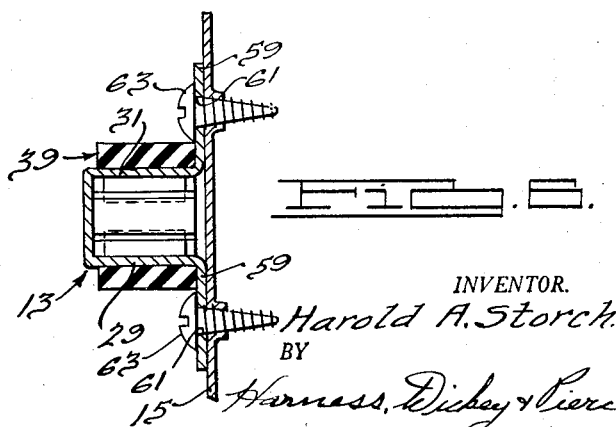
Fig. 6 is a view, similar to Fig. 4, illustrating a still further embodiment of the invention.

In certain types of installations, it may be desirable to form a sheet metal body with outwardly extending flanges 59 (see Fig. 6) for use in securing the bumper 13 to the member 15. This is accomplished by providing the flanges on the front or free ends of the side walls 29 and 31 and providing apertures 61 therein through which fastener elements, such as screws 63, may extend to secure the bumper to the member 15. With this arrangement, the front face of the bumper engages the member 15 instead of the back face, as previously described, but the flexible sleeve 39 still surrounds the periphery of the bumper to serve in substantially the same manner as previously described.

It will thus be appreciated that the bumper of this invention may be inexpensively and quickly manufactured and may be mounted on various members in a simple and rapid manner. It will also be appreciated that the bumper is not limited to use on vehicles, but may be used in any installation where relative movement between two members is to be limited to a predetermined relationship or position, and where it is desired to have a flexible or relatively soft anti-rattle bumper providing an abutment between the two members.

In many automobiles used today, particularly of the convertible or hard-top variety, there is no means provided above the window to limit the movement of the window glass when the car door is open or the car top is in a down or removed position. At the present time special bumpers are provided in the door beneath the garnish molding to limit the upward movement of the window. Such devices usually require the use of special brackets, plates and fasteners, and in many cases, garnish molding support clips as well as glass roller assemblies. With applicant's arrangement, a single bumper with its attaching screw can be secured directly to the interior panel of the door and act as a bumper, garnish molding support and roller assembly. In the embodiments of the invention illustrated in Figs. 7 through 10, different forms of bumpers and vehicle door constructions are illustrated to show how the bumper can act in the aforementioned manner.

Referring first to Figs. 7 and 8, it will be seen that a vehicle door is illustrated comprising an interior panel 67 having interior trim 69 connected therewith in a conventional manner and garnish molding 71 extending over the top of the interior panel and the interior trim. A conventional window glass 75 is disposed between the interior panel and a conventional auto door outer panel 73. The bottom edge of the glass 75 is supported in a rubber strip 77 which, in turn, is supported in a channel-shaped frame member 79 which, in turn, is connected with the window actuating mechanism including a member having a horizontally extending flange 81. The flange 81 projects interiorly of the window pane and is adapted to engage spaced bumpers 82 supported on the interior panel. Each bumper 82 includes a flexible bumper sleeve 83 sleeved on a generally rectangular sheet metal body 85 in substantially the same manner as previously described. The sheet metal member 85 in turn is adapted to be connected to a depressed portion 87 of the interior panel 67 by means of a screw and nut 89. The nut is shown as being carried within the body 85 and the side walls of the body are lanced, as previously described, at 91 to provide projections for retaining the nut against accidental displacement from the bumper. It will thus be seen in this particular embodiment that the bumpers act to limit the upward movement of the window glass and are connected directly to the interior panel of the vehicle door without the necessity of any special brackets or fasteners.

In the embodiment illustrated in Figs. 9 and 10, the bumpers serve not only to limit upward movement of the window glass 75', but also act as garnish molding supports and as supports for window rollers. In this embodiment, the interior panel 67' carries the interior trim 69' and a garnish molding 71' extends over the top of the interior trim and interior panel. The window glass 75' is supported between the interior panel 67' and an exterior panel 73' for vertical movement. The lower edge of the glass is supported in a rubber strip 77' which is mounted in a channel-shaped member 79' having a horizontally extending flange portion 81' which is adapted to engage the underside of a flexible strip 83' connected to the sheet metal body 85' of each bumper 82'. Each bumper in turn is mounted on the interior panel by a screw and nut 89', as previously described. It will, however, be noted that the bumper is supported on the interior panel so that the outer vertical leg portion 93 of the garnish molding 71' engages the front edges of the bumpers so that the bumpers act as a molding stool or support. Likewise, it will be noted that the side walls of each bumper body 85' extend beyond the front edges of the resilient sleeve 83' to provide supports 95 for a laterally extending pin 96 which, in turn, rotatably supports a flexible roller 97 which engages the window glass. It will be appreciated that in both these embodiments bumpers are provided adjacent the front and rear portions of the window glass so as to properly limit the movement of the same, and where the rollers are carried by the bumper, to properly engage and support the window glass to prevent breakages of the same when the door is slammed, or the like. It will, likewise, be appreciated that the bumper serves several purposes in this embodiment and thus eliminates as many as 72 parts now used on the so-called four-door hard-top type vehicle at the present time.

What is claimed is:

1. A bumper device, including a generally rectangular sheet metal body having side walls, a top wall, a bottom wall, and a back wall, said top and bottom walls being separated intermediate the ends thereof, said device having means for receiving fastening means for attaching the device to a member, and a sleeve of flexible material inserted over said metal body and including interconnected top, bottom and side walls sleeved over and respectively engaging the outer faces of the top, bottom and side walls of said metal body, said top and bottom flexible sleeve walls having ribs projecting downwardly and upwardly, respectively, therefrom which are disposed in the space intermediate the ends of said top and bottom walls, each of said ribs having an enlargement thereon spaced from the wall from which the rib projects and engaging the inner faces of the adjacent metal body wall so as to aid in retaining and locating the flexible sleeve on said metal body.

2. A bumper device, including a generally rectangular sheet metal body having side walls, a top wall, a bottom wall and a back wall, said top and bottom walls being separated intermediate the ends thereof, said device having means for receiving fastening means for attaching the device to a member, a sleeve of flexible material inserted over said metal body and including interconnected top, bottom and side walls sleeved over and respectively engaging the outer faces of the top, bottom and side walls of said metal body, said top and bottom flexible sleeve walls having ribs projecting downwardly and upwardly, respectively, therefrom which are disposed in the space intermediate the ends of said top and bottom walls, each of said ribs having an enlargement thereon spaced from the wall from which the rib projects and engaging the inner faces of the adjacent metal body wall so as to aid in retaining and locating the flexible sleeve on said metal body, and laterally extending flange means on the front of said metal body side walls overlapping the front edges of said flexible sleeve side walls so as to aid in retaining the flexible sleeve on said metal body.

3. A bumper device, including a generally rectangular sheet metal body having side walls, a top wall, a bottom wall and a back wall, said top and bottom walls being separated intermediate the ends thereof, said device having means for receiving fastening means for attaching the device to a member, a sleeve of flexible material inserted over said metal body and including interconnected top, bottom and side walls sleeved over and respectively engaging the outer faces of the top, bottom and side walls of said metal body, said top and bottom flexible sleeve walls having ribs projecting downwardly and upwardly, respectively, therefrom which are disposed in the space intermediate the ends of said top and bottom walls, each of said ribs having an enlargement thereon spaced from the wall from which the rib projects and engaging the inner faces of the adjacent metal body wall so as to aid in retaining and locating the flexible sleeve on said metal body, and flexible roller means rotatably supported on said metal body side walls so that the roller projects forwardly of said metal body and flexible sleeve.

4. A bumper device, including a generally rectangular sheet metal body having side walls, a top wall, a bottom wall and a back wall, said back wall having an opening therein, a fastening element engaging the front face of said back wall and disposed in alignment with said opening, projections on said side walls extending toward each other in spaced relation to said back wall and engaging said fastening element so as to permit movement of said element relative to said opening but retaining said fastening element against separation from said metal body, a sleeve of flexible material inserted over said metal body and including interconnected top, bottom and side walls sleeved over and respectively engaging the outer faces of the top, bottom and side walls of said metal body, and cooperating means on said metal body and said flexible sleeve preventing any substantial relative movement between said sleeve and said metal body.

5. A bumper device, including a generally rectangular sheet metal body having side walls, a top wall, a bottom wall and a back wall, said back wall having an opening therein, a fastening element engaging the front face of said back wall and disposed in alignment with said opening, projections on said side walls extending toward each other in spaced relation to said back wall and engaging said fastening element so as to permit movement of said element relative to said opening but retaining said fastening element against separation from said metal body, a sleeve of flexible material inserted over said metal body and including interconnected top, bottom and side walls sleeved over and respectively engaging the outer faces of the top, bottom and side walls of said metal body, cooperating means on said metal body and said flexible sleeve preventing any substantial relative movement between said sleeve and said metal body, and flexible roller means journalled on said metal body side walls and projecting forwardly beyond said metal body and said flexible sleeve.

6. A bumper device, including a generally rectangular shaped sheet metal body formed from a single piece of sheet metal, said body including a back wall having side flanges extending at substantially right angles thereto, said side flanges extending above and below the opposite ends of said back wall, the free ends of said side flanges being bent toward each other so as to provide top and bottom body flanges separated from each other by a space therebetween, a flexible sleeve inserted over said sheet metal body and including interconnected top, bottom and side walls sleeved over and respectively engaging the outer faces of the top, bottom and side flanges of said sheet metal body, said body having means for receiving fastening means for attaching the device to a member, and cooperating means on said sheet metal body and said flexible sleeve to prevent accidental separation of said sleeve from said body.

7. A bumper device, including a generally rectangular sheet metal body having side walls, a top wall, a bottom wall and a back wall, said top and bottom walls being separated intermediate the ends thereof, said device having means for receiving fastening means for attaching the device to a member, a sleeve of flexible material inserted over said metal body and including interconnected top, bottom and side walls sleeved over and respectively engaging the outer faces of the top, bottom and side walls of said metal body, said top and bottom flexible sleeve walls having ribs projecting downwardly and upwardly, respectively, therefrom which are disposed in the space intermediate the ends of said top and bottom walls, each of said ribs having an enlargement thereon spaced from the wall from which the rib projects and engaging the inner faces of the adjacent metal body wall so as to aid in retaining and locating the flexible sleeve on said metal body, and spaced serration-like projections on the outer surface of said back wall adapted to engage a member to which said bumper device is attached by said fastening means so as to positively prevent relative movement between said device and said member.

8. In combination, a wall-like member and a bumper device, said bumper device including a generally rectangular sheet metal body having side walls, a top wall, a bottom wall and a back wall, said top and bottom walls being separated intermediate their ends so as to provide a space between the adjacent wall portions, a flexible sleeve inserted over said metal body and including interconnected top, bottom and side walls sleeved over and respectively engaging the outer faces of the top, bottom and side walls, respectively, of said metal body, and cooperating means on said metal body and said flexible sleeve retaining said sleeve against any substantial relative movement with respect to said sheet metal body, said back wall of said sheet metal body having an opening therein, said wall-like member having an opening therein in alignment with said body opening, one of said openings being elongated to permit said bumper to be adjusted relative to said member, said wall-like member having projecting rib-like portions thereon engageable with said bumper device side walls to prevent rotation of said bumper device relative to said member.

9. In combination, an assembly including an interior panel, an outer panel, a pane of window glass movably disposed between said interior and outer panels, a frame member connected with the bottom edge of said pane of glass, a flange rigid with said frame member and projecting therefrom toward said interior panel, a bumper device including a generally rectangular sheet metal body having peripheral wall means and a back wall, said back wall having an opening therein, said interior panel having an opening therein, a sleeve of flexible material sleeved over said peripheral wall means, fastener means extending through said openings and connecting said bumper device to said interior panel in position to be engaged by said frame member flange means so that when said frame member and said pane of glass move to a predetermined position relative to said panels the engagement of said bumper device by said flange will limit further movement of said glass in such direction, one of said openings being elongated so as to permit the position of said bumper device to be adjusted relative to said interior panel, and cooperating means on said sleeve and said metal body for preventing accidental displacement of said sleeve relative to said body.

10. In combination, an assembly including an interior panel, an outer panel, a pane of window glass movably disposed between said interior and outer panels, a frame member connected with the bottom edge of said pane of glass, a flange rigid with said frame member and projecting therefrom toward said interior panel, a bumper device including a generally rectangular sheet metal body having peripheral wall means and a back wall, said back wall engaging said interior panel and having an opening therein, said interior panel having an opening therein, fastener means extending through said openings for connecting said bumper device to said interior panel, one of said openings being elongated so as to permit the position of said bumper device to be adjusted relative to said interior panel, a sleeve of flexible material sleeved over said peripheral wall, cooperating means on said sleeve and said metal body for preventing accidental displacement of said sleeve relative to said body, said bumper device being supported on said interior panel in position to engage said frame member flange to limit movement of said window pane in one direction, and flexible roller means rotatably supported on said bumper device sheet metal body and having a portion thereof disposed forwardly of said metal body and flexible sleeve in rolling engagement with said window pane.

11. In combination, a vehicle door assembly including an interior panel and an outer panel, a pane of window glass movably disposed between said panels, frame-like means supporting the bottom of said window pane, inwardly projecting flange means rigid with said frame means and projecting toward said interior panel, spaced apart bumper devices connected with said interior panel adjacent said window pane, each of said bumper devices including a sheet metal body having a peripheral wall and a back wall, said back wall being disposed adjacent said interior panel and having an opening therein, an opening in said interior panel, fastening means extending through said openings and securing said metal body to said interior panel, a sleeve of flexible material sleeved over said peripheral wall of said metal body, each of said devices being connected with said interior panel in position to engage said frame flange to limit movement of said window pane in one direction, interior panel trim means engaging the inner face of said interior panel, and garnish molding means extending along the top of said interior panel and engaging said interior trim means so as to cover the top of said trim means and said interior panel, said garnish molding including a depending flange portion engaging said bumper devices so that said bumper devices act as supports therefor.

12. In combination, a vehicle door assembly including an interior panel and an outer panel, a window pane disposed between said panels for vertical movement, frame-like means supporting the bottom of said window pane, inwardly projecting flange means rigid with said frame means, spaced apart bumper devices connected with said interior panel adjacent said window pane, each of said bumper devices including a sheet metal body having a peripheral wall and a back wall, said back wall being disposed adjacent to and connected with said interior panel, a sleeve of flexible material sleeved over said peripheral wall of said metal body, each of said devices being connected with said interior panel in position to engage said frame flange to limit vertical movement of said window pane in one direction, interior trim means engaging the inner face of said interior panel, garnish molding means extending along the top of said interior panel and engaging said interior trim means so as to cover the top of said trim means and said interior panel, said garnish molding including a depending flange portion engaging said bumper devices, and flexible roller means supported on each of said bumper devices in rolling engagement with said window pane.

References Cited in the file of this patent
UNITED STATES PATENTS

| | | |
|---|---|---|
| 1,826,922 | Carr | Oct. 13, 1931 |
| 1,828,120 | Perry | Oct. 13, 1931 |
| 1,908,839 | Greig | May 16, 1933 |
| 2,069,219 | Conlon | Feb. 2, 1937 |